United States Patent
Dashevsky

(10) Patent No.: US 12,321,327 B2
(45) Date of Patent: *Jun. 3, 2025

(54) INDEX SPLITTING IN DISTRIBUTED DATABASES

(71) Applicant: DASSAULT SYSTEMES SE, Velizy Villacoublay (FR)

(72) Inventor: Yevgeniy Dashevsky, Bedford, MA (US)

(73) Assignee: DASSAULT SYSTEMES SE, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,414

(22) Filed: Jan. 10, 2023

(65) Prior Publication Data
US 2023/0161747 A1 May 25, 2023

Related U.S. Application Data

(63) Continuation of application No. 16/639,390, filed as application No. PCT/US2018/000142 on Aug. 15, 2018, now Pat. No. 11,573,940.
(Continued)

(51) Int. Cl.
*G06F 7/00* (2006.01)
*G06F 16/182* (2019.01)
(Continued)

(52) U.S. Cl.
CPC ........ *G06F 16/2228* (2019.01); *G06F 16/182* (2019.01); *G06F 16/2315* (2019.01); *G06F 16/24554* (2019.01); *H04L 9/085* (2013.01)

(58) Field of Classification Search
CPC .............. G06F 16/2228; G06F 16/182; G06F 16/2315; G06F 16/24554; G06F 16/2272; H04L 9/085; H04L 67/1097
(Continued)

(56) References Cited

U.S. PATENT DOCUMENTS

| 4,733,353 A | 3/1988 | Jaswa |
| 4,853,843 A | 8/1989 | Ecklund |

(Continued)

FOREIGN PATENT DOCUMENTS

| CN | 101395602 A | 3/2009 |
| CN | 101471845 A | 7/2009 |

(Continued)

OTHER PUBLICATIONS

"Album Closing Policy," Background, retrieved from the Internet at URL:http://tools/wiki/display/ENG/Album+Closing+Policy (Jan. 29, 2015), 4 pp.
(Continued)

*Primary Examiner* — Md I Uddin
(74) *Attorney, Agent, or Firm* — Smith Baluch LLP

(57) ABSTRACT

In a distributed database, many nodes can store copies, or instances, of the same record. If the record is split on one node, it should be split on the other nodes to maintain consistency, concurrency, and correctness of the data in the distributed database. In some distributed databases, the records are locked during the update process to ensure data integrity. Unfortunately, locking the records can increase latency, especially for larger databases. But if the records aren't locked and a node fails as a record is being split and updated simultaneously, the split and update may not propagate throughout the distributed database, leading to a loss of data integrity. Exchanging messages about the status of record splitting and forwarding updates internally reduces the likelihood of a loss of data integrity due to a node failure.

21 Claims, 10 Drawing Sheets

Related U.S. Application Data

(60) Provisional application No. 62/545,791, filed on Aug. 15, 2017.

(51) Int. Cl.
| | |
|---|---|
| *G06F 16/22* | (2019.01) |
| *G06F 16/23* | (2019.01) |
| *G06F 16/2455* | (2019.01) |
| *H04L 9/08* | (2006.01) |

(58) Field of Classification Search
USPC ....... 707/610, 722, 737, 770, 638, 654, 736, 707/741, 747, 752, 999.102, 17.022; 705/3, 7.17, 7.21, 14.41, 14.49, 14.7, 26, 705/26.1, 313
See application file for complete search history.

(56) References Cited

U.S. PATENT DOCUMENTS

| | | |
|---|---|---|
| 5,446,887 A | 8/1995 | Berkowitz |
| 5,524,240 A | 6/1996 | Barbara et al. |
| 5,555,404 A | 9/1996 | Torbjornsen et al. |
| 5,568,638 A | 10/1996 | Hayashi et al. |
| 5,625,815 A | 4/1997 | Maier et al. |
| 5,701,467 A | 12/1997 | Freeston |
| 5,764,877 A | 6/1998 | Lomet et al. |
| 5,806,065 A | 9/1998 | Lomet |
| 5,960,194 A | 9/1999 | Choy et al. |
| 6,216,151 B1 | 4/2001 | Antoun |
| 6,226,650 B1 | 5/2001 | Mahajan et al. |
| 6,275,863 B1 | 8/2001 | Leff et al. |
| 6,334,125 B1 | 12/2001 | Johnson et al. |
| 6,401,096 B1 | 6/2002 | Zellweger |
| 6,424,967 B1 | 7/2002 | Johnson et al. |
| 6,480,857 B1 | 11/2002 | Chandler |
| 6,499,036 B1 | 12/2002 | Gurevich |
| 6,523,036 B1 | 2/2003 | Hickman et al. |
| 6,748,394 B2 | 6/2004 | Shah et al. |
| 6,792,432 B1 | 9/2004 | Kodavalla et al. |
| 6,862,589 B2 | 3/2005 | Grant |
| 7,026,043 B2 | 4/2006 | Jander |
| 7,080,083 B2 | 7/2006 | Kim et al. |
| 7,096,216 B2 | 8/2006 | Anonsen |
| 7,184,421 B1 | 2/2007 | Liu et al. |
| 7,219,102 B2 | 5/2007 | Zhou et al. |
| 7,233,960 B1 | 6/2007 | Boris et al. |
| 7,293,039 B1 | 11/2007 | Deshmukh et al. |
| 7,353,227 B2 | 4/2008 | Wu |
| 7,395,352 B1 | 7/2008 | Lam et al. |
| 7,401,094 B1 | 7/2008 | Kesler |
| 7,403,948 B2 | 7/2008 | Ghoneimy et al. |
| 7,562,102 B1 | 7/2009 | Sumner et al. |
| 7,853,624 B2 | 12/2010 | Friedlander et al. |
| 7,890,508 B2 | 2/2011 | Gerber et al. |
| 8,108,343 B2 | 1/2012 | Wang et al. |
| 8,122,201 B1 | 2/2012 | Marshak et al. |
| 8,224,860 B2 | 7/2012 | Starkey |
| 8,266,122 B1 | 9/2012 | Newcombe et al. |
| 8,504,523 B2 | 8/2013 | Starkey |
| 8,756,237 B2 | 6/2014 | Stillerman et al. |
| 8,930,312 B1 | 1/2015 | Rath et al. |
| 9,008,316 B2 | 4/2015 | Acar et al. |
| 9,501,363 B1 | 11/2016 | Ottavio |
| 9,734,021 B1 | 8/2017 | Sanocki et al. |
| 9,824,095 B1 | 11/2017 | Taylor et al. |
| 10,067,969 B2 | 9/2018 | Rice et al. |
| 10,740,323 B1 | 8/2020 | Palmer et al. |
| 11,176,111 B2 | 11/2021 | Palmer et al. |
| 11,561,961 B2 | 1/2023 | Palmer et al. |
| 11,573,940 B2 | 2/2023 | Dashevsky |
| 2002/0112054 A1 | 8/2002 | Jatanaka |
| 2002/0152261 A1 | 10/2002 | Arkin et al. |
| 2002/0152262 A1 | 10/2002 | Arkin et al. |
| 2002/0178162 A1 | 11/2002 | Ulrich et al. |
| 2003/0051021 A1 | 3/2003 | Hirschfeld et al. |
| 2003/0149709 A1 | 8/2003 | Banks |
| 2003/0204486 A1 | 10/2003 | Berks et al. |
| 2003/0220935 A1 | 11/2003 | Vivian et al. |
| 2004/0153459 A1 | 8/2004 | Whitten et al. |
| 2004/0263644 A1 | 12/2004 | Ebi |
| 2005/0013208 A1 | 1/2005 | Hirabayashi et al. |
| 2005/0086384 A1 | 4/2005 | Ernst |
| 2005/0198062 A1 | 9/2005 | Shapiro |
| 2005/0216502 A1 | 9/2005 | Kaura et al. |
| 2006/0010130 A1 | 1/2006 | Leff et al. |
| 2006/0168154 A1 | 7/2006 | Zhang et al. |
| 2007/0067349 A1 | 3/2007 | Jhaveri et al. |
| 2007/0156842 A1 | 7/2007 | Vermeulen et al. |
| 2007/0288526 A1 | 12/2007 | Mankad et al. |
| 2008/0086470 A1 | 4/2008 | Graefe |
| 2008/0106548 A1 | 5/2008 | Singer |
| 2008/0228795 A1 | 9/2008 | Lomet |
| 2008/0320038 A1 | 12/2008 | Liege |
| 2009/0113431 A1 | 4/2009 | Whyte |
| 2010/0094802 A1 | 4/2010 | Luotojarvi et al. |
| 2010/0115246 A1 | 5/2010 | Seshadri et al. |
| 2010/0153349 A1 | 6/2010 | Schroth et al. |
| 2010/0191884 A1 | 7/2010 | Holenstein et al. |
| 2010/0235606 A1 | 9/2010 | Oreland et al. |
| 2010/0297565 A1 | 11/2010 | Waters et al. |
| 2011/0087874 A1 | 4/2011 | Timashev et al. |
| 2011/0231447 A1* | 9/2011 | Starkey ............... G06F 16/27 707/E17.055 |
| 2012/0136904 A1 | 5/2012 | Ravi |
| 2012/0254175 A1 | 10/2012 | Horowitz et al. |
| 2013/0060922 A1 | 3/2013 | Koponen et al. |
| 2013/0086018 A1 | 4/2013 | Horii |
| 2013/0110766 A1 | 5/2013 | Promhouse et al. |
| 2013/0110774 A1 | 5/2013 | Shah et al. |
| 2013/0110781 A1 | 5/2013 | Golab et al. |
| 2013/0124467 A1 | 5/2013 | Naidu et al. |
| 2013/0159265 A1 | 6/2013 | Peh et al. |
| 2013/0159366 A1 | 6/2013 | Lyle et al. |
| 2013/0232378 A1 | 9/2013 | Resch et al. |
| 2013/0259234 A1 | 10/2013 | Acar et al. |
| 2013/0262403 A1 | 10/2013 | Milousheff et al. |
| 2013/0278412 A1 | 10/2013 | Kelly et al. |
| 2013/0297565 A1 | 11/2013 | Starkey |
| 2013/0311426 A1 | 11/2013 | Erdogan et al. |
| 2014/0108414 A1 | 4/2014 | Stillerman et al. |
| 2014/0258300 A1 | 9/2014 | Baeumges et al. |
| 2014/0279881 A1 | 9/2014 | Tan et al. |
| 2014/0297676 A1 | 10/2014 | Bhatia et al. |
| 2014/0304306 A1 | 10/2014 | Proctor et al. |
| 2015/0019739 A1 | 1/2015 | Attaluri et al. |
| 2015/0032695 A1 | 1/2015 | Tran et al. |
| 2015/0066858 A1 | 3/2015 | Sabdar et al. |
| 2015/0135255 A1 | 5/2015 | Theimer et al. |
| 2015/0370505 A1 | 12/2015 | Shuma et al. |
| 2016/0134490 A1 | 5/2016 | Balasubramanyan et al. |
| 2016/0350392 A1* | 12/2016 | Rice ................. G06F 16/2282 |
| 2016/0371355 A1 | 12/2016 | Massari et al. |
| 2017/0039099 A1 | 2/2017 | Ottavio |
| 2017/0139910 A1 | 5/2017 | Mcalister et al. |
| 2017/0212680 A1 | 7/2017 | Waghulde |
| 2022/0035786 A1 | 2/2022 | Palmer et al. |

FOREIGN PATENT DOCUMENTS

| | | |
|---|---|---|
| CN | 101251843 B | 6/2010 |
| CN | 101268439 B | 4/2012 |
| EA | 002931 B1 | 10/2002 |
| EP | 1403782 A2 | 3/2004 |
| JP | 2003256256 A | 9/2003 |
| JP | 2006048507 A | 2/2006 |
| JP | 2007058275 A | 3/2007 |
| RU | 2315349 C1 | 1/2008 |

(56) References Cited

FOREIGN PATENT DOCUMENTS

| RU | 2008106904 A | 8/2009 |
|---|---|---|
| WO | 2010034608 A1 | 4/2010 |

OTHER PUBLICATIONS

"Distributed Coordination in NuoDB," YouTube, retrieved from the Internet at URL:https://www.youtube.com/watch?feature=player_embedded&v=URoeHvflVKg on Feb. 4, 2015, 2 pp.
"Durable Distributed Cache Architecture", retrieved from the Internet at URL: http://www.nuodb.com/explore/newsql-cloud-database-ddc-architecture on Feb. 4, 2015, 3 pages.
"Glossary—NuoDB 2.1 Documentation / NuoDB," retrieved from the Internet at URL: http://doc.nuodb.com/display/doc/Glossary on Feb. 4, 2015, 1 pp.
"How It Works," retrieved from the Internet at URL: http://www.nuodb.com/explore/newsql-cloud-database-how-it-works?mkt_tok=3RkMMJW on Feb. 4, 2015, 4 pp.
"How to Eliminate MySQL Performance Issues," NuoDB Technical Whitepaper, Sep. 10, 2014, Version 1, 11 pp.
"Hybrid Transaction and Analytical Processing with NuoDB," NuoDB Technical Whitepaper, Nov. 5, 2014, Version 1, 13 pp.
"No Knobs Administration," retrieved from the Internet at URL: http://www.nuodb.com/explore/newsql-cloud-database-product/auto-administration on Feb. 4, 2015, 4 pp.
"NuoDB at a Glance," retrieved from the Internet at URL: http://doc.nuodb.com/display/doc/NuoDB+at+a+Glance on Feb. 4, 2015, 1 pp.
"SnapShot Albums," Transaction Ordering, retrieved from the Internet at URL:http://tools/wiki/display/ENG/Snapshot+Albums (Aug. 12, 2014), 4 pp.
"Table Partitioning and Storage Groups (TPSG)," Architect's Overview, NuoDB Technical Design Document, Version 2.0 (2014), 12 pp.
"The Architecture & Motivation for NuoDB," NuoDB Technical Whitepaper, Oct. 5, 2014, Version 1, 27 pp.
"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.
"What Is a Distributed Database? and Why Do You Need One," NuoDB Technical Whitepaper, Jan. 23, 2014, Version 1, 9 pp.
Advisory Action issued by The United States Patent and Trademark Office for U.S. Appl. No. 14/215,461, mailed Jan. 10, 2017, 9 pages.
Advisory Action mailed May 2, 2018 for U.S. Appl. No. 14/215,461, 8 pages.
Amazon CloudWatch Developer Guide API, Create Alarms That or Terminate an Instance, Jan. 2013, downloaded Nov. 16, 2016 from archive.org., pp. 1-11.
Amazon RDS FAQs, Oct. 4, 2012, 39 pages.
Bergsten et al., "Overview of Parallel Architectures for Databases," The Computer Journal vol. 36, No. 8, pp. 734-740 (1993).
Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.
Dan et al., "Performance Comparisons of Buffer Coherency Policies," Proceedings of the International Conference on Distributed Computer Systems, IEEE Comp. Soc. Press vol. 11, pp. 208-217 (1991).
Extended European Search Report in European Patent Application No. 18845799.8 dated May 25, 2021, 8 pages.
Final Office Action dated Nov. 24, 2017 from U.S. Appl. No. 14/215,401, 33 pages.
Final Office Action dated Nov. 3, 2016 from U.S. Appl. No. 14/215,401, 36 pp.
Final Office Action dated Sep. 9, 2016 from U.S. Appl. No. 14/215,461, 26 pp.
Final Office Action mailed Jan. 10, 2018 from U.S. Appl. No. 14/215,461, 30 pages.
Garding, P. "Alerting on Database Mirorring Events," Apr. 7, 2006, downloaded Dec. 6, 2016 from technet.microsoft.com, 24 pp.
Hull, Autoscaling MySQL on Amazon EC2, Apr. 9, 2012, 7 pages.
International Search Report and Written Opinion in International Patent Application No. PCT/US18/00142 mailed Dec. 13, 2018. 11 pages.
Iqbal et al., "Performance Tradeoffs in Static and Dynamic Load Balancing Strategies," Institute for Computer Applications in Science and Engineering, 1986, pp. 1-23.
Leverenz et al., "Oracle8i Concepts, Partitioned Tables and Indexes," Chapter 11, pp. 11-12-11/66 (1999).
Non-Final Office Action dated Jan. 21, 2016 from U.S. Appl. No. 14/215,401, 19 pp.
Non-Final Office Action dated May 31, 2017 from U.S. Appl. No. 14/215,401, 27 pp.
Non-Final Office Action mailed Jun. 1, 2017 from U.S. Appl. No. 14/215,461, 21 pp.
Office Action with translation in Korean Application No. 10-2020-7006901 dated Dec. 16, 2022, 30 pages.
Oracle Database Concepts 10g Release 2 (10.2), Oct. 2005, 14 pages.
Rahimi, S. K. et al., "Distributed Database Management Systems: A Practical Approach," IEEE Computer Society, John Wiley & Sons, Inc. Publications (2010), 765 pp.
Roy, N. et al., "Efficient Autoscaling in the Cloud using Predictive Models for Workload Forecasting," IEEE 4th International Conference on Cloud Computing, 2011, pp. 500-507.
Searchcloudapplications.techtarget.com, Autoscaling Definition, Aug. 2012, 1 page.
Shaull, R. et al., "A Modular and Efficient Past State System for Berkeley DB," Proceedings of USENIX ATC '14:2014 USENIX Annual Technical Conference, 13 pp. (Jun. 19-20, 2014).
Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.
Veerman, G. et al., "Database Load Balancing, MySQL 5.5 vs PostgreSQL 9.1," Universiteit van Amsterdam, System & Network Engineering, Apr. 2, 2012, 51 pp.
Yousif, M. "Shared-Storage Clusters," Cluster Computing, Baltzer Science Publishers, Bussum, NL, vol. 2, No. 4, pp. 249-257 (1999).
Office Action (Rejection) with translation in Korean Application No. 10-2020-7006901 dated Jun. 14, 2023, 13 pages.
Office Action in Chinese Application No. 201880056617.1 with translation dated May 4, 2023, 27 pages.
Office Action In European Application No. 18845799.8 dated Jun. 12, 2023, 7 pages.
Weng, et al. "Implementation of distributed index in cluster environment." (with abstract) Journal of Computer Applications 36.1 (2016): 10 pages.
Zhang et al. Distributed Spatial Data Transfer with oraclespatial, Science and Technology Information, 2011, 3 pages (Attached to Chinese Office Action dated May 4, 2023).
Office Action with translation in Vietnam App. 1-2020-01249 Apr. 24, 2024, 3 pages.
Office Action (Second) with Search Report in Chinese Application No. 201880056617.1 with translation dated Feb. 21, 2024, 39 pages.
Sedgwick, Algorithms in C++ Parts 1-4 Fundamentals, Data Structures, Sorting, Searching, China Electric Power Press, 3rd edition, Feb. 29, 2004, 12 pages.

* cited by examiner

INDEX ATOM 76

| 76A | INDEX ATOM ID |
|---|---|
| 76B | POINTER TO MASTER CATALOG |
| 76C | POINTER TO CREATING CATALOG |
| 76D | POINTER TO CHAIRMAN |
| 76E | CHANGE NUMBER |
| 76F | LIST OF RELAYS |
| 76G | CYCLE REFERENCE |
| 76H | ACTIVE NODE LIST |
| 76I | STATUS STATES |
| 76J | BINARY TREE OF INDEX NODES |
| 76K | INDEX LEVEL |
| 76L | |
| 76M | |

FIG. 4

INDEX SPLITTING IN DISTRIBUTED DATABASES

CROSS-REFERENCE TO RELATED APPLICATION(S)

This application is a continuation of U.S. application Ser. No. 16/639,390, filed on Feb. 14, 2020, which is a national-stage application, under 35 U.S.C. § 371, of International Application No. PCT/US2018/000142, filed on Aug. 15, 2018, which in turn claims the priority benefit, under 35 U.S.C. § 119 (e), of U.S. Application No. 62/545,791, filed on Aug. 15, 2017. Each of these application is incorporated herein by reference in its entirety.

BACKGROUND

Databases typically incorporate indexes for enabling the efficient retrieval of certain information. A B-tree data structure is a popular indexing structure that is optimized for use in a database that reads and writes large blocks of data and that enables efficient database searching. A B-Tree data structure includes a root and a plurality of leaves. The root uses a different key value to identify each leaf. Each leaf points to the records that contain the key value. The key values are sorted in order to form a sorted list. Specifically, a given leaf includes a "left sibling" (the next leaf to the left) and a "right sibling" (the next left to right) in the sorted order. The first or left-most leaf and last or right-most leaf include entries denoting the ends of the list of leaves for that root.

Typically, each leaf has a fixed memory size. As more data is added to the database, the leaf grows in size until it reaches a size threshold, at which point the leaf is split into new left and right leaves at a particular key value. The left leaf receives values that are less than the key value and the right leaf receives the remaining values with appropriate modifications to the root.

In centrally based and non-shared databases, the splitting process is efficient because generally there is only one copy of the index in the database system. The split is easy to effect by quiescing the data processing system during the actual splitting operation. In a distributed database with many copies of the index, each copy of the index should be split to maintain accuracy, completeness, and data integrity. Unfortunately, splitting multiple copies of the same index can cause a race condition that leads to an erroneous or inconsistent split.

In order to assure consistency following the split of a given index in a node, some existing approaches implement locks. A lock is applied to individual pages or records while the index is being split. The lock prevents additional data from being added or removed from the database until after the index has been split. However, locking a database during an index split is not a scalable approach. Locking can also increase the latency associated with adding information to the database.

SUMMARY

Embodiments of the present technology include methods of splitting a first index atom in a plurality of atoms in a distributed database. The distributed database includes a plurality of nodes. Each node in the plurality of nodes comprises a corresponding processor and a corresponding memory. One node in the plurality of nodes is designated as a chairman and includes a chairman's copy of the first index atom. An example method comprises splitting the chairman's copy of the first index atom by the chairman. The chairman's copy of the first index atom represents data and/or metadata stored in the distributed database. The chairman transmits instructions to split respective copies of the first index atom to the other nodes in the plurality of nodes. The respective copies of the first index atom in other nodes are replicas of the chairman's copy of the first index atom. A first node in the plurality of nodes splits a first copy of the first index atom into a first copy of a source atom and a first copy of a target atom. The first node transmits an acknowledgement indicating that the first copy of the first index atom has been split. The acknowledgement is transmitted to the chairman and to each other node in the plurality of nodes.

In some cases, the chairman splits the first copy of the first index atom in response to a request from another node in the plurality of nodes. The method also comprises forwarding a message from the first copy of the source atom to the first copy of the target atom at the first node. In some cases, transmitting the acknowledgement from the first node to the chairman and to each other node in the plurality of nodes can occur after the first copy of the source atom forwards the message to the first copy of the target atom.

Another embodiment includes a method of splitting an index atom in a plurality of atoms in a distributed database. Again, the distributed database includes a plurality of nodes, each of which comprises a corresponding processor and a corresponding memory. One of these nodes is designated as a chairman for the index atom and includes a chairman's instance of the index atom, which represents data and/or metadata stored in the distributed database. The method includes splitting, by the chairman, the chairman's instance of the index atom. The chairman transmits the instructions to split the index atom to at least a subset of the nodes. Each node in the subset includes a corresponding instance of the index atom. A first node in the subset splits its (first) instance of the index atom into a first instance of a source atom and a first instance of a target atom. The first node also re-transmits the instructions to split the index atom to each other node in the subset. And the first node transmits, to the chairman, an acknowledgement indicating that the first instance of the index atom has been split. The chairman transmits a message indicating the index atom has been split to the subset of nodes.

Yet another embodiment includes a method of splitting an index atom in a plurality of atoms in a distributed database that includes a plurality of nodes, each of which comprises a corresponding processor and a corresponding memory. In this method, one of the nodes splits a local instance of the index atom into a local instance of a source atom and a local instance of a target atom. The local instance of the source atom includes values less than a split key value and the local instance of the target atom includes values greater than the split key value. The node receives a message referring to a key value greater than the split key value on the local instance of the source atom. And the node forwards the message from the local instance of the source atom to the local instance of the target atom.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4 illustrates an index atom that can be split.

DETAILED DESCRIPTION

Embodiments described herein generally relate to distributed databases and more particularly to splitting indexes in distributed databases. The systems and processes disclosed herein use a two-stage index splitting process to address problems associated with maintaining correctness while splitting many copies of the same index in a distributed database without locking the distributed database during the splitting process. During the first stage of the index splitting process, the nodes in the distributed database with the index atom split the index atom into a source atom and a target atom. And during the second stage of the index splitting process, the nodes with the index flush messages being forwarded from the source atom to the target atom. This two-stage splitting process makes it easier to maintain correctness, concurrency, and consistency across the distributed databased if data is being inserted while the index atom is being split.

Distributed Databases

Figure 1:
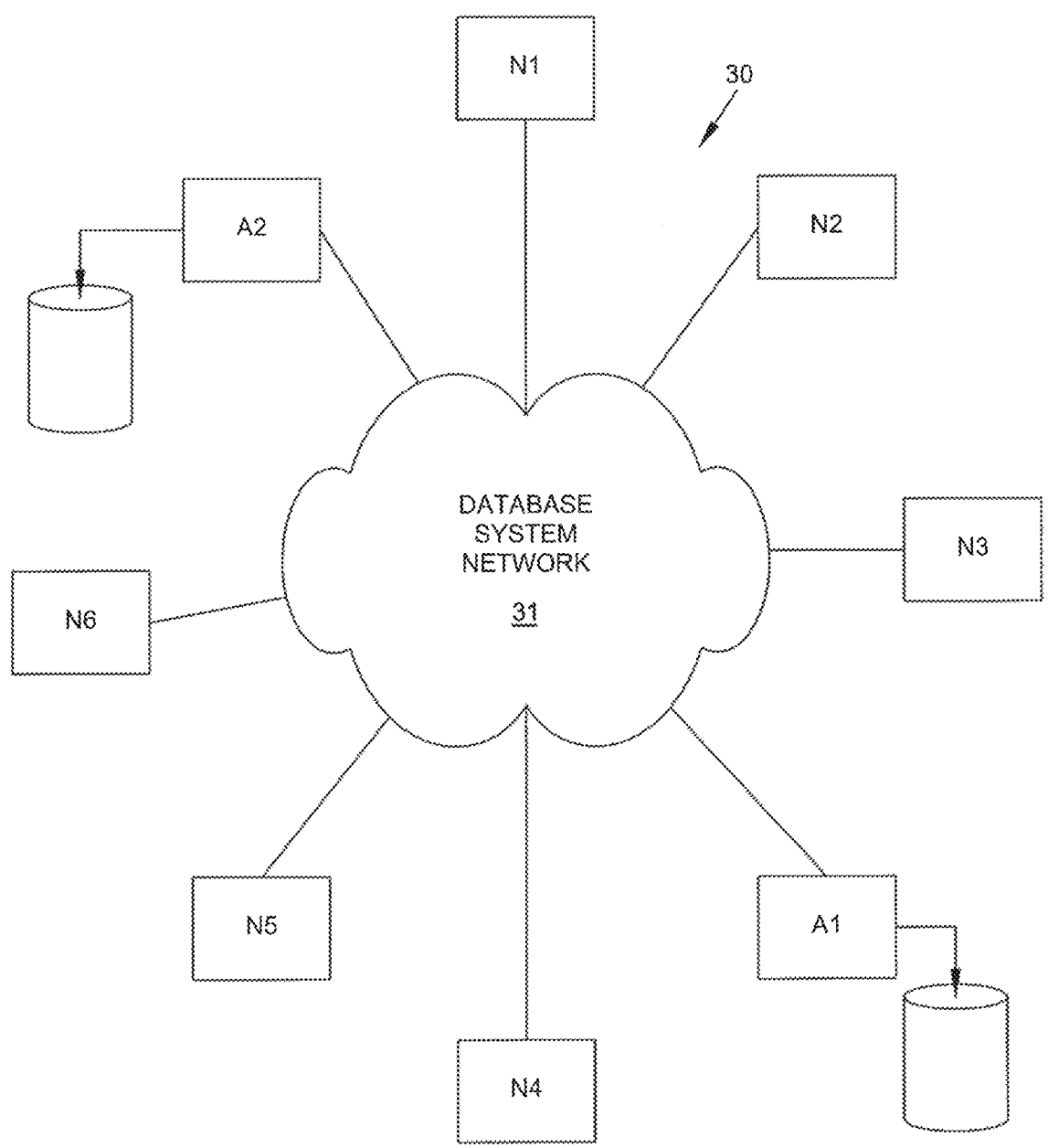
FIG. 1 is a schematic form of an elastic, scalable, on-demand distributed database.

FIG. 1 depicts an elastic, scalable, on-demand, distributed database 30 that a two-stage index splitting process to promote and ensure correctness when splitting indexes. The distributed database 30 includes multiple nodes of different types: nodes N1 through N6 are transactional nodes that provide user access to the database; nodes A1 and A2 are archival nodes that act as storage managers and function to maintain a disk archive of the entire database at each archival node. While an archival node normally stores a copy of the entire database, each transactional node can contain only that portion of the database used to support transactions being performed at that transactional node at that time.

Each node in FIG. 1 can communicate directly with each other node in the distributed database 30 through a database communications network 31. For example, node N1 can establish a communications path with each of nodes N2 through N6, A1 and A2. Communications between any two nodes is by way of serialized messages. In one embodiment, the messaging is performed in an asynchronous manner to perform various operations in a timely and prompt manner. Typically, the database communications network 31 operates with a combination of high-bandwidth, low-latency paths (e.g., an Ethernet network) and high-bandwidth, high-latency paths (e.g., a wide area network (WAN)). Each node can use a low-latency path for time-critical communications (e.g., fetching a record in response to a query) and a high-latency path for non-critical communications (e.g., a request to update information for a table). The data communications network 31 uses a messaging protocol, such as the Transmission Control Protocol (TCP), and assures that each node processes messages in the same sequence in which the messages were transmitted.

Transactional Nodes

Figure 2:
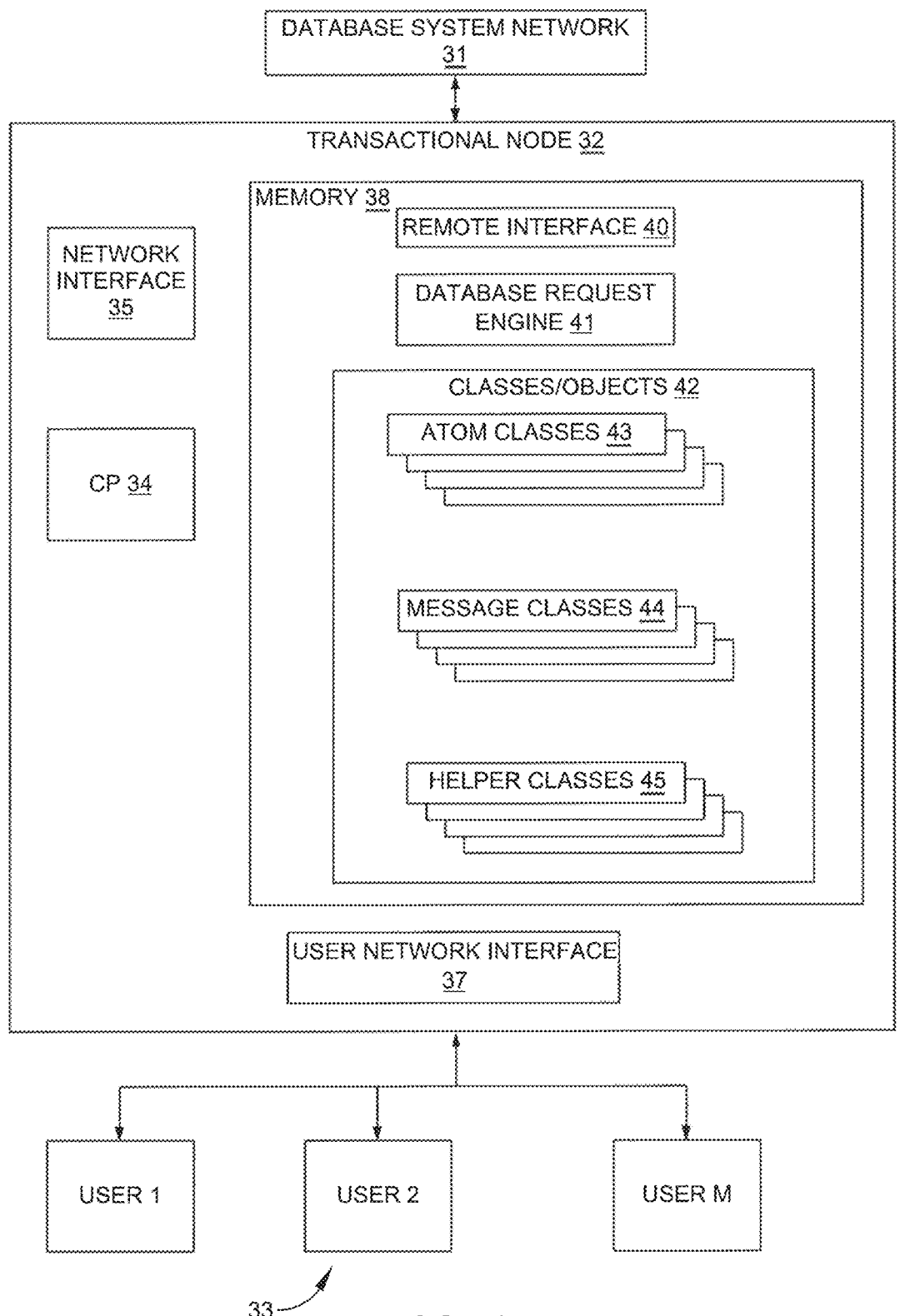
FIG. 2 illustrates a representative transactional node of the distributed database of FIG. 1.

FIG. 2 depicts a representative transactional node 32 in the distributed database 30 of FIG. 1. The transactional node 32 links to other nodes (not shown) via the database communications network 31 and various end users 33. The transactional node 32 includes a processor 34 that communicates with the database communications network 31 through a network interface 35 and with the various users through a user network interface 37. The processor 34 also interacts with a non-volatile memory 38, such as a random-access memory (RAM), that contains a copy of the database management program that implements the distributed database operations and index splitting disclosed in greater detail below. This program functions to provide a remote interface 40, a database request engine 41, and a set 42 of classes or objects. The database request engine 41 resides on transactional nodes and is the interface between the high-level input and output commands at the user level and system-level input and output commands at the system level. In general terms, the database request engine 41 parses, compiles, and optimizes user queries, such as structured query language (SQL) queries, into commands that are interpreted by the various classes or objects in the set 42.

At any given time, the transactional node 32 contains only those portions of the database that are then relevant to user applications active on the transactional node 32. Moreover, the portions of distributed database in use at a given time at the transactional node 32 reside in the memory 38. There is no need for supplementary storage, such as disk storage, at the transactional node 32 during the operation of this system.

Atoms

In this system, the classes/objects set 42 is divided into a subset 43 of atom classes, a subset 44 of message classes, and a subset 45 of helper classes. Each atom class 43 in FIG. 2 produces atoms. More specifically, each atom class 43 defines one or more atom types or atom objects. Each atom type or atom object produces an atom. Each atom contains a specific fragment of information stored in the distributed database. Some atoms contain a portion of the database metadata; others contain data records; still others serve as catalogs that create and track other atom types. Some atom types may only instantiate one atom which replicates to all nodes. Other atom types may instantiate multiple atoms which are replicated to nodes on an as-needed basis.

Figure 3A:
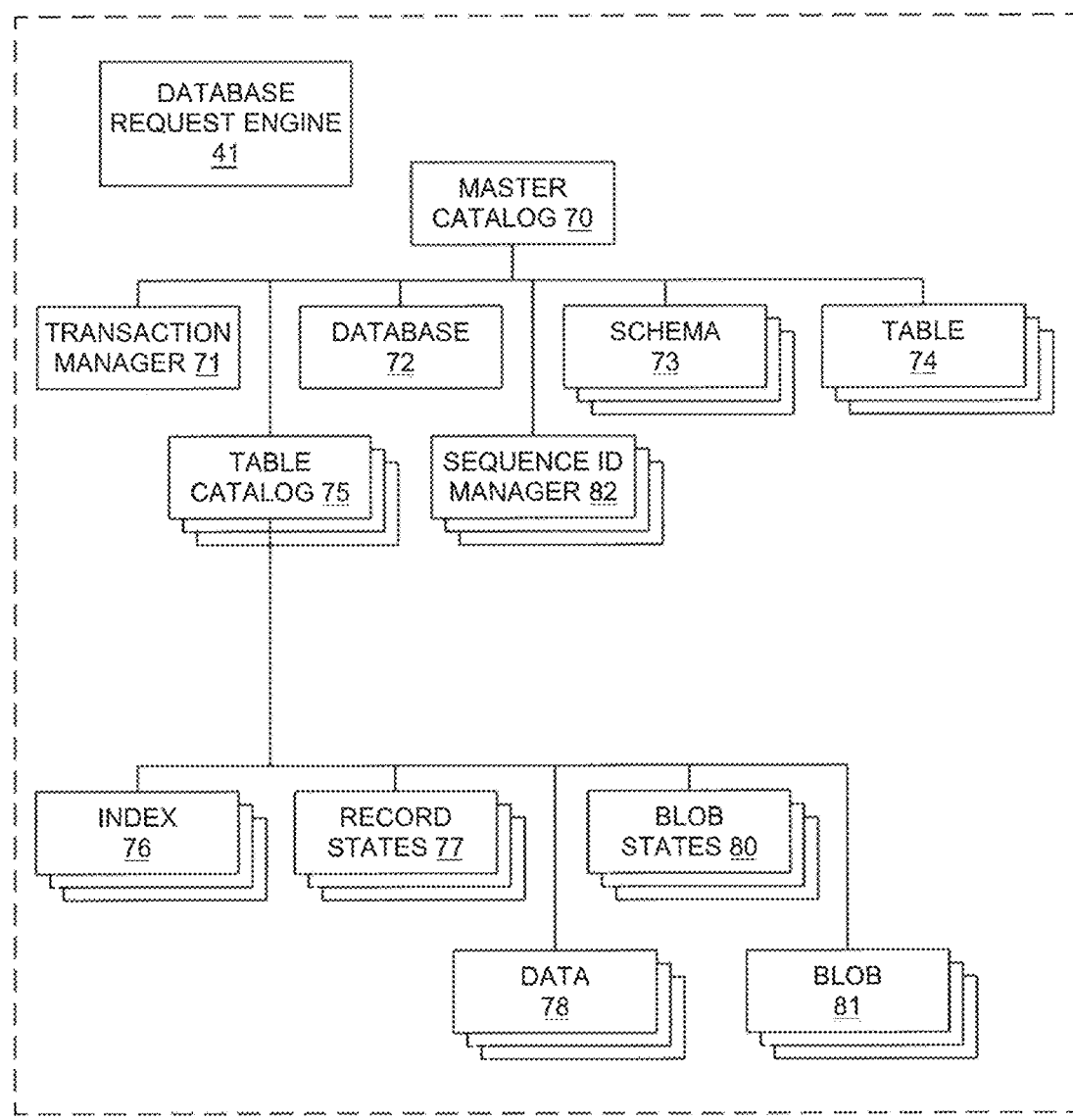
FIGS. 3A and 3B depict a local organization of atom objects generated by atom classes in the transactional node of FIG. 2.
Figure 3B:
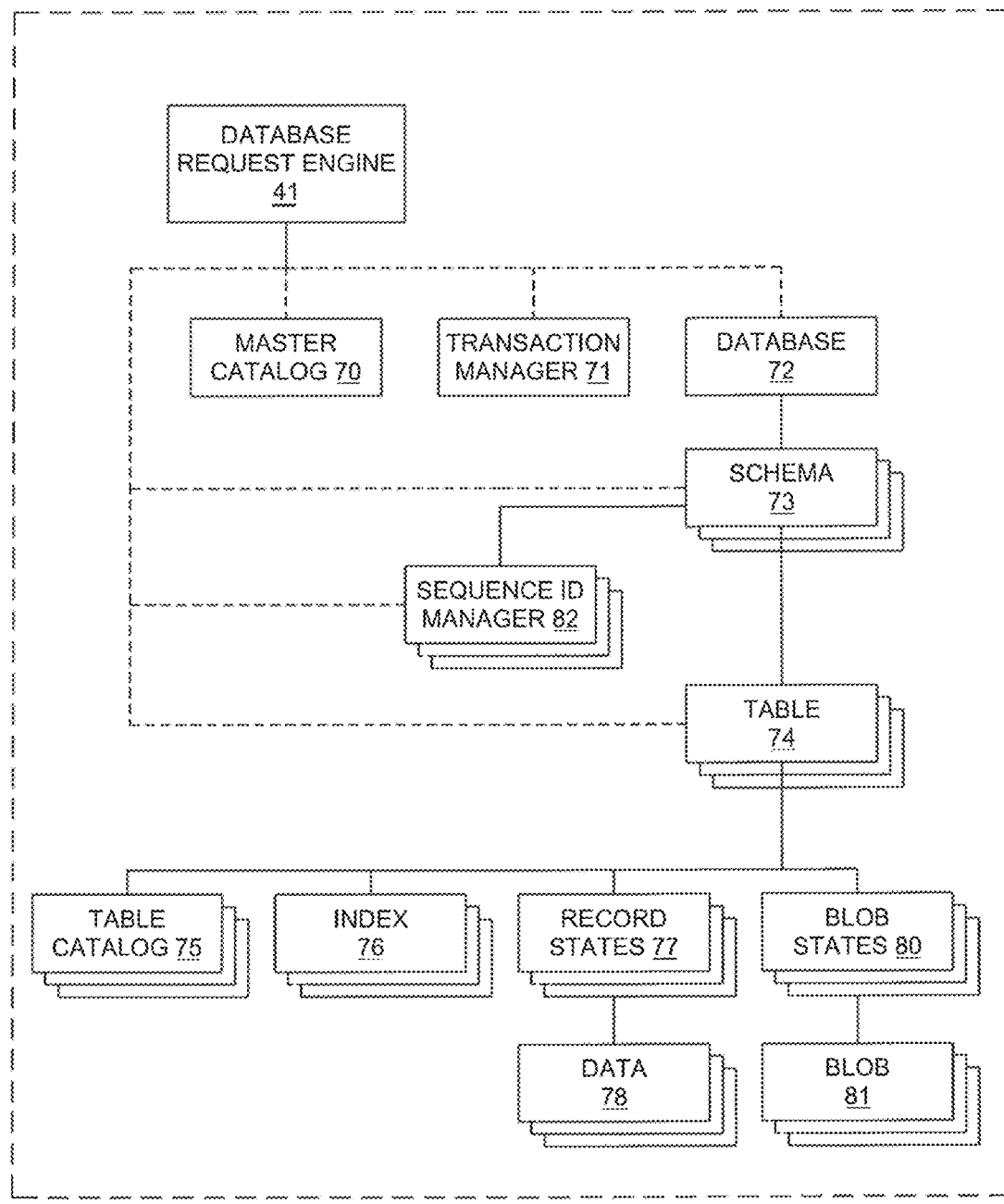

FIGS. 3A and 3B show different types of atoms and how the atoms interact with each other. In FIG. 3A, a Master Catalog atom 70 tracks the status of transactional and archival nodes in the distributed database 30 of FIG. 1. The Master Catalog atom 70 can be considered an active index that creates and monitors a Transaction Manager atom 71, Database atom 72, Schema atoms 73, sets of Table atoms 74 and Table Catalog atoms 75, and Sequence ID Managers 82. The Table Catalog atom 75 acts as an active index that creates and monitors Index atoms 76, Record States atoms 77, Data atoms 78, Blob States atoms 80 and Blob atoms 81 associated with a single table. There is one Table Catalog atom 75 for each table.

FIG. 3B is useful in understanding the interaction and management of different atom types. In this context, neither the Master Catalog atom 70 nor the Table Catalog atom 75 performs any management functions. The Database atom 72 manages each Schema atom 73. Each Schema atom 73 manages each related Table atom 74 and Sequence ID Manager atom 82. Each Table atom 74 manages its corresponding Table Catalog atom 75, Index atoms 76, Record States atoms 77, Data atoms 78, Blob States atom 80 and Blob atoms 81. The database request engine 41 communicates with the Master Catalog atom 70, Transaction Manager atom 71, Database atom 72, each Schema atom 73, each Table atom 74 and Sequence ID Managers 82 in response to user queries.

FIG. 4 depicts an index atom 76 in greater detail. The index atom 76 is implemented as a B-Tree index with elements 76A-76K and can be split as described in greater detail below. Element 76A is a unique identification for the index atom 76. Pointers 76B and 76C identify a master catalog atom and the creating catalog atom, respectively. Element 76D points to the node where the chairman for that atom resides. (Each atom has a chairman that performs functions as described below.)

Each time a copy of an atom is changed in any transactional node, the copy of the atom receives a new change number. Element 76E records that change number. Whenever a node requests an atom from another node, there is an interval during which time the requesting node may not be known to the other transactional nodes. Element 76F is a list of all the nodes to which the supplying node relays messages that contain the atom until the request is completed.

Operations of the database system are also divided into cycles. A cycle reference element 76G provides the cycle number of the last access to the atom. Element 76H is a list of the all active nodes that contain the atom. Element 76I includes several status indicators. Element 76J contains a binary tree of index nodes to provide a conventional indexing function. Element 76K contains an index level.

Chairmen

When a transactional node in the distributed database creates a new atom, that transactional node is designated as the new atom's chairman. Each atom can have a different chairman, and a given node can be the chairman for more than one atom. As the new atom's chairman, the transactional node establishes and maintains an ordered list of other nodes in the distributed database with copies of the new atom. The order of this list is as follows: first the chairman, then any transactional nodes with the new atom, and then any archival nodes with new atom.

When the transactional node creates the new atom, it is the first and only entry in the ordered list. As other nodes obtain copies of the new atom, they are added to the ordered list. Each transactional node with a copy of the new atom also keeps a copy of the ordered list. If the chairman becomes inactive for any reason, the next transactional node on the ordered list becomes the chairman. If there are no transactional nodes on the ordered list, the first non-synchronizing archival node becomes the chairman.

Messaging Among Nodes

The nodes exchange transfer atoms and information about atoms via asynchronous messages to maintain the distributed database in a consistent and concurrent state. As mentioned above, each node in the distributed database can communicate with every other node in the distributed database. When one node generates a message involving a specific atom, it can transmit or broadcast that message to the other nodes with replicas of that specific atom. Each node generates these messages independently of other nodes. It is possible that, at any given instant, multiple nodes may contain copies of a given atom and different nodes may be at various stages of processing them.

Figure 5:
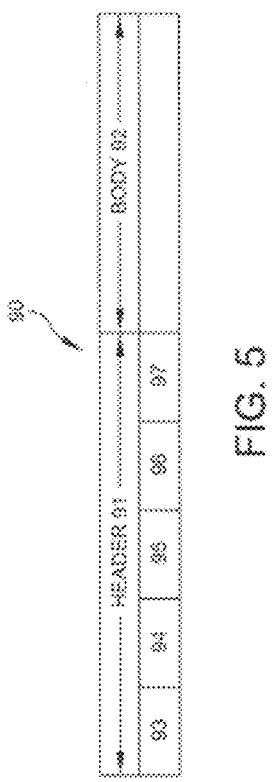
FIG. 5 illustrates an example asynchronous message that transfers between transactional and archival nodes.

FIG. 5 depicts the basic syntax of a typical serialized message 90 transmitted asynchronously between any two nodes using the TCP or another protocol with controls to maintain messaging sequences. The message 90 includes a variable-length header 91 and a variable-length body 92. The header 91 includes a message identifier code 93 that specifies the message and its function. The header 91 also includes identification 94 of the software version that created the message, enabling different nodes to operate with different software versions. The remaining elements in the header include a local identification 95 of the sender and information 96 for the destination of the message and atom identification 97. From this information, a recipient node can de-serialize, decode and process the message.

Data Integrity During Index Splitting

As mentioned above, distributed databases suffer from data integrity problems that don't affect other types of databases. Many of these data integrity problems arise from the desire to maintain consistency and across the nodes containing instances (copies) of a given atom (piece of data or metadata). If the data is not consistent across all nodes, then two nodes could supply different answers to the same query.

When the atom is split, the nodes conventionally rebroadcast messages about the split to other nodes in the database. Unfortunately, rebroadcasts can lead to multiple scenarios that result in transient consistency violations. If the chairman fails during the split, those inconsistencies could become permanent or at least persist until an atom with incorrect data is dropped. These problems include incorrect references to a target atom on a node that has yet to split its instance of the index atom. This can cause consistency problems or crashes. If the references to the target atom is never updated, the distributed database may enter an infinite loop in backward scan (while holding cycle lock). In addition, it is possible to miss a split message while fetching an object from a node before the node has split and the node originating the split fails before sending any final messages about the split.

Figure 6:
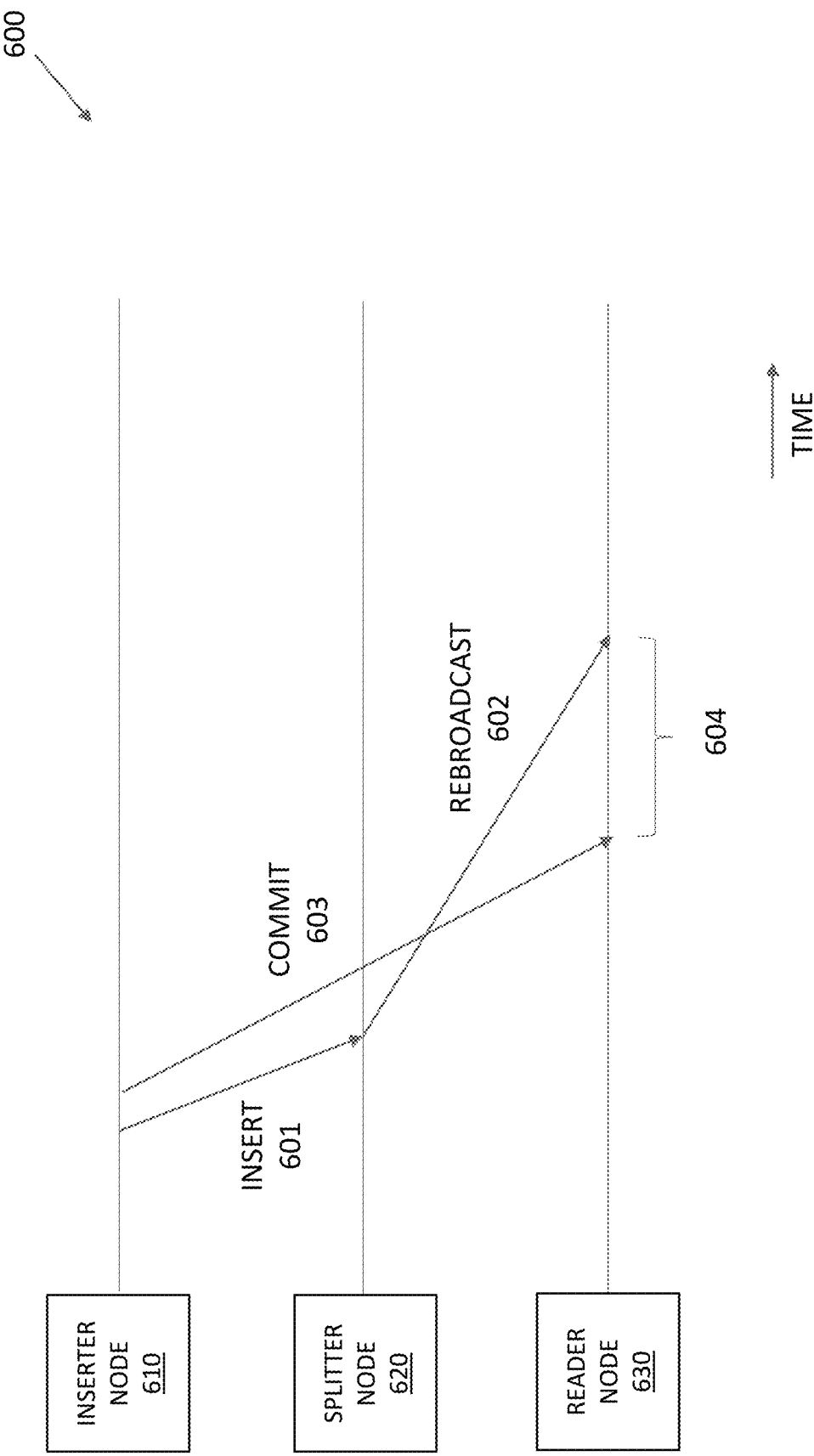
FIG. 6 illustrates how splitting an atom in a distributed database can lead to retrieval of incorrect data.

FIG. 6 is a timing diagram that illustrates how using rebroadcasts to split an index atom in a distributed database can lead to a loss of data integrity in a distributed database.

The timing diagram illustrates index splitting among three nodes in the distributed database: an inserter node 610, a splitter node 620 (e.g., a root chairman), and a reader node 630. In this example, the inserter node 610 and the splitter node 620 each include an instance of the same index atom. The source node 610 receives a new value for inserting into the index atom. In response, it transmits an insertion message 601 to the splitter node 620. This insertion message 601 instructs the splitter node 620 to split its instance of the index atom at a split key value, or key value for short.

The splitter node 620 responds to the insertion message 601 by splitting the index atom into a source atom and a target atom, with entries equal to or less than the split key value in the source atom and entries greater than the split key value in the target atom. The splitter node 620 also rebroadcasts (at 602) the insertion message to the reader node 630, which responds to the rebroadcast by updating its instance of a root atom that refers to the index atom to show that the index atom has been split. But if the reader node 630 receives a commit transaction message 603 before it receives the rebroadcast 602, it may retrieve potentially incorrect information in response for a period 604 between the arrival of the rebroadcast 602 and the commit transaction message 603. And if the splitter node 620 fails before sending the rebroadcast 602, the reader node 630 may never learn about the split, leaving the distributed databased inconsistent and possibly incorrect.

Maintaining Correctness During Index Splitting

Figure 7A:
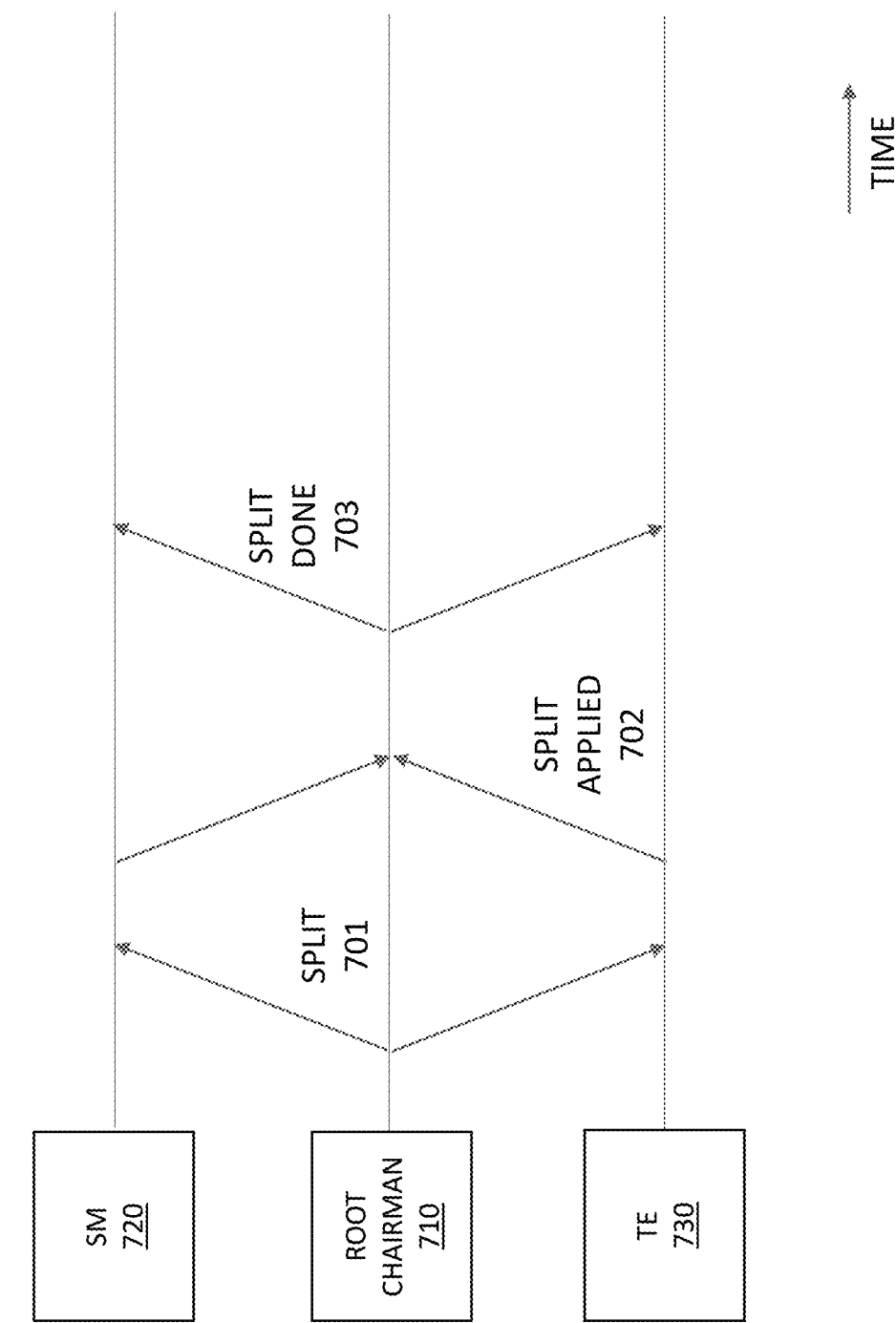
FIG. 7A illustrates a prior process for splitting an index atom in a distributed database.

FIG. 7A illustrates a prior process 700 for mitigating failures during index splitting. The process 700 starts when a root chairman 710 for an index atom determines that the index atom should be split, e.g., in response to a request from another node or a request to insert a value into the chairman's instance of the index atom. The root chairman splits its instance of the index atom and sends a "split" message 701 to other nodes with instances of the index atom-here, an archival (storage manager (SM)) node 720 and a transactional (transaction engine (TE)) 730. These nodes split their instances of the index atom, then send respective "split applied" messages 702 to the root chairman 710. Once the root chairman 710 has received a "split applied" message from each node in the distributed database with an instance of the index atom being split, it sends a "split done" message 703 to the nodes affected by the split.

Although the process 700 in FIG. 7A addresses the problems with splitting index atoms shown in FIG. 6, it can suffer from crashing during failover and a never-ending or unfinished split. Crashing during failover can occur if the chairman fails and the new (replacement) chairman is missing the atom(s) created during the splitting process. An unfinished split can occur if a transactional node hijacks chairmanship node from an archival node. This can occur if an archival node becomes chairman after the original chairman fails and a new transactional node fetches a copy of the index atom being split before the split is complete. The new transactional node expects to receive messages pertaining to the index atom, but the archival node does not send them because the addition of the new transactional node does not trigger their transmission. As a result, the split never finishes.

Other potential problems associated with the prior process 700 include "chairmanship pileup" and the difficulty of exhaustive testing. A chairmanship pileup occurs in the prior process 700 because the root chairman for the index atom orchestrates the split. As a result, the root chairman become the chairman for the new atoms created during split; in other words, the new atoms "pile up" on the root chairman, leaving the distributed database more vulnerable if the root chairman fails.

Exhaustive testing becomes difficult when considering a state machine on a given node and the events that move this state machine from state to state. For exhaustive testing, each valid state/event pair should be verified. Since a given state is composed of four atoms (each in several states itself), the number of unit tests for exhaustive testing becomes prohibitive.

Exhaustively testing a particular system typically involves generating a set of valid state/event pairs and then generating test for each pair. For illustration, consider a system that can have two states A and B and two possible events X and Y. This give four state/event pairs—here, AX, AY, BX and BY—each of which should be tested. The number of tests is the Cartesian product of events and states.

In an example distributed database, the state of the system is defined by the state of the relevant atoms. In the process 700 in FIG. 7A, the split operates on four atoms at once, so the number of possible states is a Cartesian product of states of four atoms, which yields about 1300 tests given the number of possible events. Splitting four atoms with the process in FIG. 7B reduces the number of valid and relevant state/event pairs to about 130, which more tractable for tractable testing than 1300.

Figure 7B:
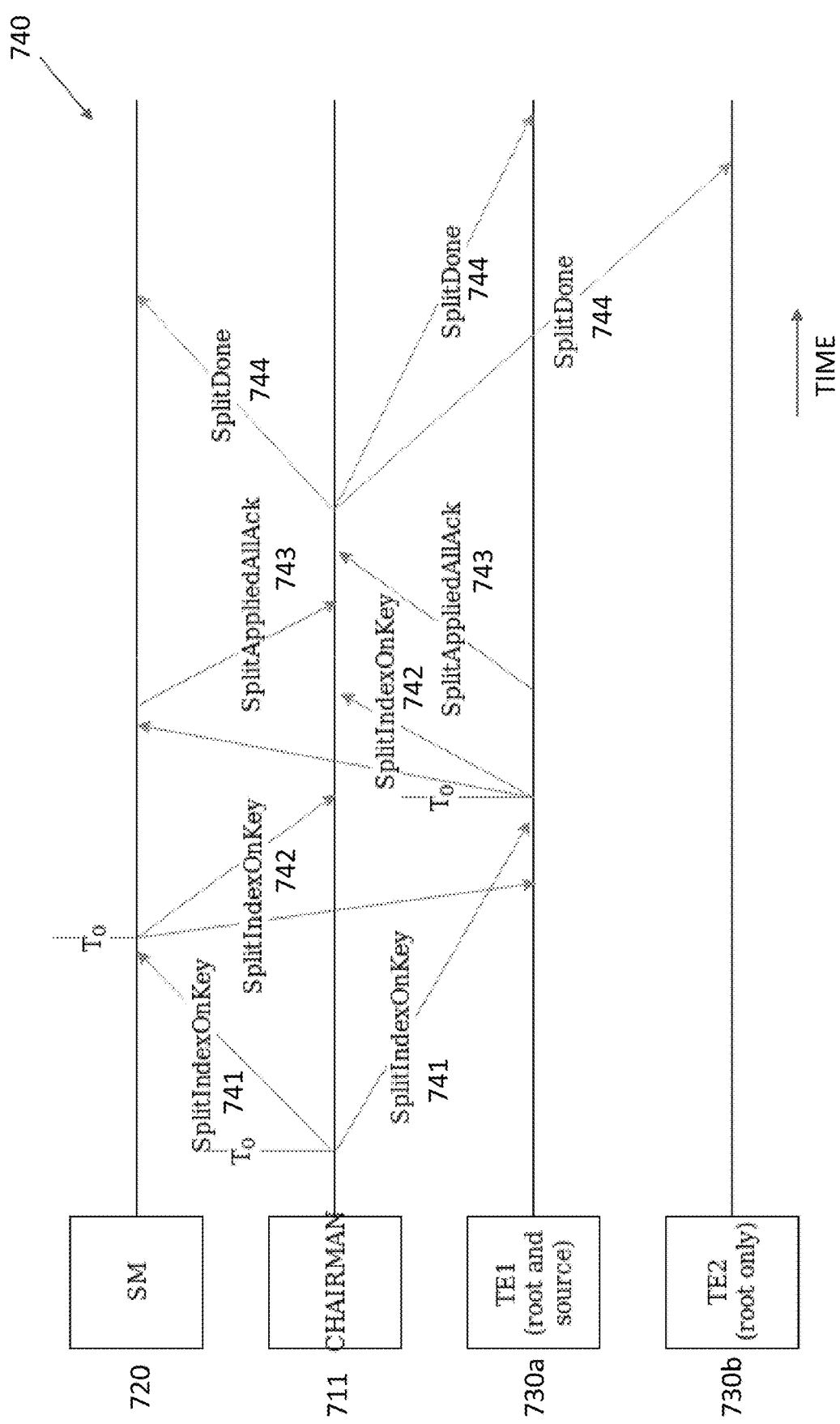
FIG. 7B illustrates a process for splitting an index atom while maintaining correctness and consistency throughout a distributed database.

FIG. 7B illustrates a process 740 for splitting an index atom, copies of which are stored in several nodes in a distributed database, that addresses both the fundamental problems illustrated in FIG. 6 and the shortcomings of the prior process 700 in FIG. 7A. In this case, the nodes with instances of the index atom include a chairman 711, an archival node 720, and a first transactional node 730*a*. Unlike the root chairman 710 in FIG. 7A, the chairman 711 doesn't have to be chairman of the root atom associated with the index atom being split. Instead, it can be chairman of the index atom being split. The distributed database also includes nodes without instances of the index atom, such as a second transactional node 730*b*. Each of these nodes can be implemented as a processor that executes computer instructions stored in a non-volatile memory and can be collocated with other nodes.

In the first stage of the process 750, the nodes split the index atom into a source index atom, or source, and a target index atom, or target. The process begins when the chairman 711 of the index atom determines that the index atom should be split, e.g., in response to an attempt to insert a value into its instance of the index atom. If the chairman 711 determines that the index atom should be split, it selects a key value for the split. This key value indicates which records will stay in the original source index atom and which records will be transferred to the new target index atom created by the split.

The chairman 711 splits its copy of the index atom at the key value to create its own copies of the source index atom and target index atom. It also broadcasts an "execute split" message 741 to the other nodes 720, 730*a* in the distributed database with instances of the index atom. In response to receiving the "execute split" message 741 from the chairman, each of these other nodes 720, 730*a* splits its own copy of the index atom at the key value to create its own copies of the source index atom and target index atom. Unlike in other index splitting process, each of these nodes also re-transmits the "execute split" message 742 to the other nodes with the index atom, including the chairman 711. Once the other nodes 720, 730*a* have received "execute split" messages 742 from every possible source and have split their own instances of the index atom, they transmit a "split applied" 743 to the chairman 711. The chairman 711 then broadcasts a "split done" message 744 to the nodes 720, 730a with the split index atom and to other nodes affected by the split, including nodes with root atoms that point to the split index atom (e.g., transactional node 730b). This completes the index splitting process 740 in FIG. 7B.

As explained below, the source index atoms forward messages to the target index atoms during a portion of the splitting process 740. To ensure that these messages are forwarded correctly, each node containing a copy of the index atom (including the chairman 711) tracks the index splitting progress using its ordered list of all of the nodes in the distributed database that contain a copy of the index atom. This is another difference from previous index splitting processes.

Figure 7C:
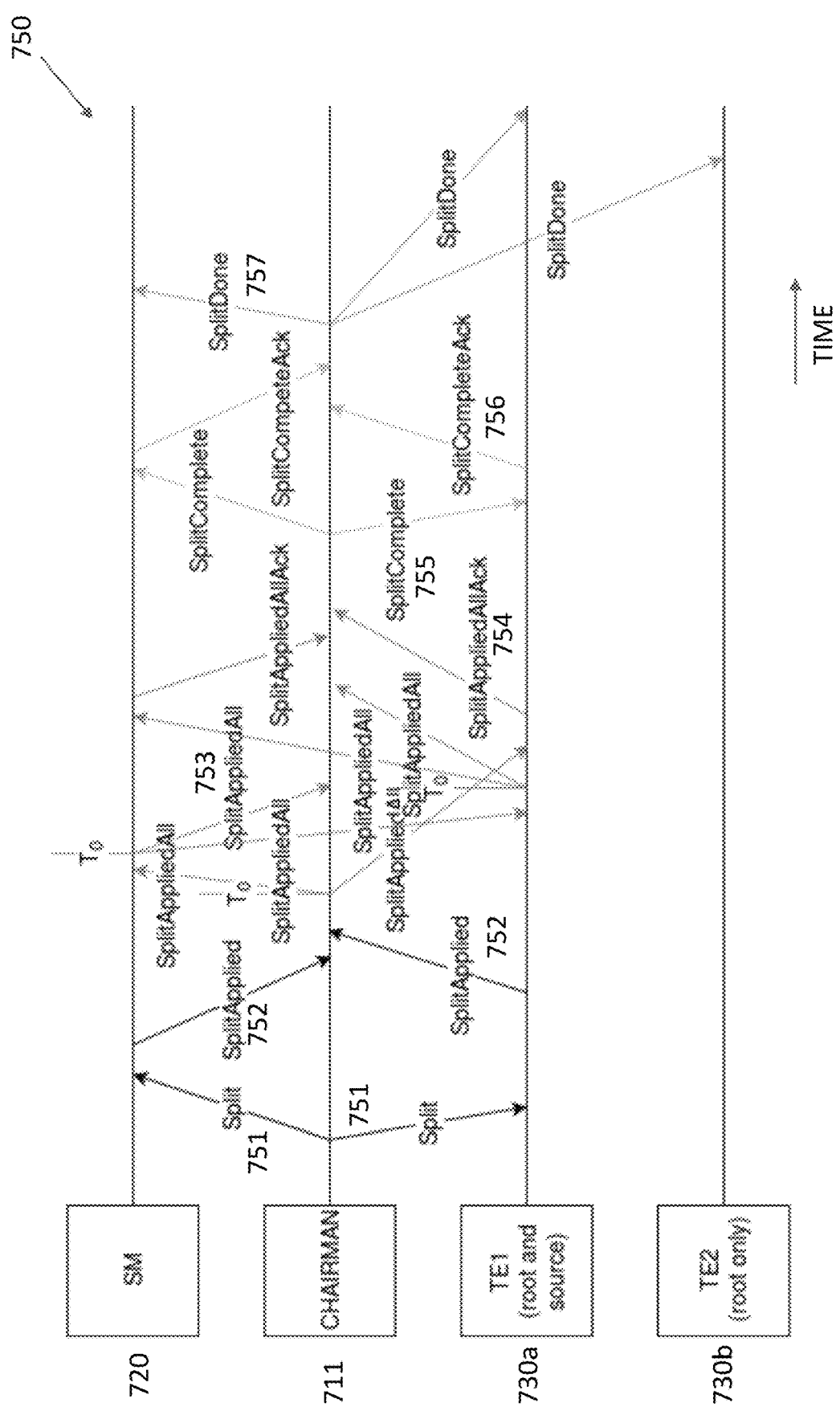
FIG. 7C illustrates an alternative process for splitting an index atom while maintaining correctness and consistency throughout a distributed database.

FIG. 7C illustrates an alternative process 750 for splitting an index atom. In this process, the chairman 711 splits its copy of the index atom at the key value to create its own copies of the source index atom and target index atom. It also broadcasts an "execute split" message 751 to the other nodes 720, 730a in the distributed database with instances of the index atom. In response to receiving the "execute split" message 751 from the chairman 711, each of these other nodes 720, 730a splits its own copy of the index atom at the key value to create its own copies of the source index atom and target index atom. Unlike in other index splitting process, each non-chairman sends a "split applied" message 752 to every other node with a copy of the index atom.

The nodes track the index splitting progress as follows. Once each node has received a "split applied" message 752 from each other node on the ordered list, it transmits a "split applied all" message 753 to the chairman 711 and the other nodes with split index atoms. This signifies that every copy of the index atom has been split into a source and a target. The nodes then exchange "split applied ack" message 754 acknowledging the "split applied" messages 753. Once the chairman 711 has receive a "split applied ack" message 754 from the affected nodes, it broadcasts a "split complete" message 755, to which the affected node responds with "split complete ack" messages 756.

Again, the source index atoms forward messages to the target index atoms during a portion of the splitting process 750 as explained above with respect to FIG. 7B and below. And as noted above, in yet another difference from previous index splitting processes, the chairman 711 waits until all messages are forwarded from the source to the target as described below, by waiting to receive "split applied all" messages from all other nodes. The chairman then broadcasts a "split done" message 757 to all of the affected nodes. All of the nodes with the source and target atoms replace outdated references to the original index atom in their copies of the root atom with references to the new source. This completes the index splitting process 700.

Message Forwarding During Index Splitting

As mentioned above, the distributed database is not locked during the index splitting processes 740 or 750. As a result, information can be added to the index atom while it is being split and new copies of the index atom can be created during the split. This reduces latency and makes it simpler and easier to scale the distributed database.

To maintain correctness and data integrity during the index splitting process, the nodes forward messages received during certain periods of the index splitting process. More specifically, a node forwards messages that are broadcast on the source atom but should be applied on the target atom. These messages are generated before TO in FIGS. 7B and 7C. Once a first node receives a SplitIndexOnKey message 741/751 from a second node, the first node should not receive messages that need to be forwarded from the second node. The nodes finish splitting and stop forwarding messages only when they know that messages that should be forwarded is not supposed to exist.

Forwarding occurs as follows. If a node receives a message addressed to the index atom after its copy of the index atom has been split into a source and a target, it directs the message to source. If the message's destination has a key value that is equal to or less than the split key value, the source acts on the message. And if the message's destination has a key value that is greater than the split key value, the source forwards the message to the target (if target is present on this node), which acts on the message. The target atom cannot exist on the node without the source atom, so forwarding from the source atom to the target atom is an operation local to the node.

Message forwarding ensures that messages destined for the target actually reach the target. It accounts for the possibility that splitting the index could occur simultaneously in all the nodes, or simultaneously in some nodes and at a different time in other nodes, or at different times in each node that has a copy of the index atom. Message forwarding continues until the node receives a "split applied all" message from each other node in processes 740 and 750 shown in FIGS. 7B and 7C. At this point, the chairman inserts a reference to the target in the root atom corresponding to the split index atom as explained above. As a result, message forwarding is no longer necessary, and messages for the target are addressed to the target instead of being addressed to the source and forwarded by the source to the target.

In other words, the index splitting process 700 is considered to be complete when: 1) every node containing the index atom has been split into a source and a target; 2) every node acknowledges that it is no longer accepting message forwarding; and 3) the root is modified to include a reference to the target. That is, the index splitting process 750 ends when every node has obtained both "split applied all" messages from each other node and a "split done" message from the chairman and has determined that message forwarding is no longer necessary for the source and target.

Advantages of Two-Stage Index Splitting

Previous processes for splitting an index atom do not include broadcasting "split" messages from non-chairman nodes to other (non-chairman) nodes as in the process 740 of FIG. 7B, nor do they include sending "split applied" messages to non-chairman nodes, tracking "split applied" messages, or transmitting "split applied all" messages to the chairman as in the process 750 of FIG. 7C. As a result, they can be faster and consume less bandwidth than the processes 740 and 750 shown in FIGS. 7B and 7C, respectively. This is because these processes involve exchanging messages among all the nodes as opposed to just between each non-chairman node and the chairman (order $N^2$ messages for N nodes versus order N messages for previous index splitting processes). But unlike previous index splitting processes, exchanging these extra messages maintains the correctness and integrity of the distributed database even in the event of a node failure.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of splitting an index atom in a plurality of atoms in a distributed database, the distributed database comprising a plurality of nodes, each node in the plurality of nodes comprising a corresponding processor and a corresponding memory, the method comprising:
   splitting, by a node in the plurality of nodes, a local instance of the index atom into a local instance of a source atom and a local instance of a target atom in response to instructions to split the index atom from a designated node in the plurality of nodes, the local instance of the source atom including values less than a split key value and the local instance of the target atom including values greater than the split key value;
   after splitting the local instance of the index atom and before receiving a message indicating that every instance of the index atom stored in the distributed database has been split into a corresponding instance of the source atom and a corresponding instance of the target atom, maintaining data consistency across the distributed database when data is being inserted into the distributed database while the index atom is being split by:
      receiving, by the node on the local instance of the source atom, a message referring to a key value greater than the split key value; and
      forwarding, by the node, the message from the local instance of the source atom to the local instance of the target atom; and
   tracking, by the node, progress with splitting the index atom by other nodes in the plurality of nodes with respective instances of the index atom, the tracking including receiving, by the node, "split applied all" messages from the other nodes indicating that every instance of the index atom has been split and a "split done" message from the designated node indicating that the designated node has received "split applied all" messages from every node in the plurality of nodes with an instance of the index atom,
   wherein splitting the index atom ends when (1) every instance of the index atom has been split into a local instance of the source atom and a local instance of the target atom, (2) the nodes in the plurality of nodes with respective instances of the index atom are no longer forwarding messages, and (3) a root atom for the index atom has been modified to include a reference to the target atom.

2. The method of claim 1, wherein the designated node is a chairman for the index atom.

3. The method of claim 2, further comprising:
   receiving, by the node, the instructions to split the index atom from each other node in the plurality of nodes.

4. The method of claim 2, further comprising, before receiving the instructions to split the index atom from the chairman:
   transmitting, by the node on the local instance of the index atom, a message referring to a key value greater than the split key value.

5. The method of claim 4, further comprising, after splitting the local instance of the index atom:
   transmitting, by the node on the local instance of the target atom, a message referring to a key value greater than the split key value.

6. The method of claim 1, further comprising:
   transmitting, by the node, a message indicating that the local instance of the index atom has been split into the local instance of the source atom and the local instance of the target atom to each other node in the plurality of nodes containing an instance of the index atom.

7. The method of claim 6, wherein transmitting the message indicating that the local instance of the index atom has been split into the local instance of the source atom and the local instance of the target atom occurs after forwarding the message from the local instance of the source atom to the local instance of the target atom.

8. The method of claim 1, further comprising:
   receiving, by the node, a message from the designated node indicating that each instance of the index atom in the distributed database has been split; and
   acknowledging, by the node, the message from the designated node.

9. The method of claim 8, wherein receiving the message from the designated node and acknowledging the message from the designated node occur after forwarding the message from the local instance of the source atom to the local instance of the target atom.

10. The method of claim 1, wherein tracking progress with splitting the index atom by the other nodes comprises receiving, by the node, a message from each of the other nodes indicating that the index atom has been split.

11. A node in a distributed database comprising a plurality of nodes,
   the node comprising:
      a processor;
      a network interface operably coupled to the processor and configured to communicate with other nodes in the distributed database; and
      a memory operably coupled to the processor and storing a local instance of an index atom and instructions, which, when executed by the processor, cause the node to:
         split the local instance of the index atom into a local instance of a source atom and a local instance of a target atom in response to instructions to split the index atom from a designated node in the plurality of nodes, the local instance of the source atom including values less than a split key value and the local instance of the target atom including values greater than the split key value;
         after splitting the local instance of the index atom and before receiving a message indicating that every instance of the index atom stored in the distributed database has been split into a corresponding instance of the source atom and a corresponding instance of the target atom, maintain data consistency across the distributed database when data is being inserted into the distributed database while the index atom is being split by:
forwarding a message received on the local instance of the source atom and referring to a key value greater than the split key value to the local instance of the target atom; and
tracking progress with splitting the index atom by other nodes in the plurality of nodes with respective instances of the index atom based on "split applied all" messages from the other nodes indicating that every instance of the index atom has been split and a "split done" message from the designated node indicating that the designated node has received "split applied all" messages from every node in the plurality of nodes with an instance of the index atom,
wherein the splitting the index atom ends when (1) every instance of the index atom has been split into a local instance of the source atom and a local instance of the target atom, (2) the nodes in the plurality of nodes with respective instances of the index atom are no longer forwarding messages, and (3) a root atom for the index atom has been modified to include a reference to the target atom.

12. The node of claim 11, wherein the designated node is a chairman for the index atom.

13. The node of claim 12, wherein the network interface is configured to receive the instructions to split the index atom from each other node in the distributed database.

14. The node of claim 12, wherein the node is configured to, before receiving the instructions to split the index atom from the chairman, transmit a message referring to a key value greater than the split key value on the local instance of the index atom.

15. The node of claim 14, wherein the node is further configured to, after splitting the local instance of the index atom, transmit a message referring to a key value greater than the split key value on the local instance of the target atom.

16. The node of claim 11, wherein the node is configured to transmit a message indicating that the local instance of the index atom has been split into the local instance of the source atom and the local instance of the target atom to each other node in the distributed database containing an instance of the index atom.

17. The node of claim 11, wherein the node is configured to receive a message from a chairman for the index atom indicating that each instance of the index atom in the distributed database has been split and to transmit an acknowledgement of the message from the chairman.

18. A method of splitting an index atom in a distributed database into a source atom including values less than a split key value and a target atom including values greater than the split key value, the distributed database comprising a plurality of nodes, each node in the plurality of nodes comprising a corresponding processor and a corresponding memory, the method comprising:
during a first stage, splitting, at each node in the plurality of nodes containing an instance of the index atom in response to instructions to split the index atom from a designated node in the plurality of nodes, the corresponding instance of the index atom into a corresponding instance of the source atom and a corresponding instance of the target atom;
during a second stage, forwarding, from the instances of the source atom to the respective instances of the target atom, messages referring to key values greater than the split key value to maintain data consistency across the distributed database when data is being inserted into the distributed database while the index atom is being split; and
tracking progress with splitting the index atom by each node in the plurality of nodes containing an instance of the index atom, the tracking including transmitting "split applied all" messages from each node in the plurality of nodes containing an instance of the index atom indicating that every instance of the index atom has been split and receiving a "split done" message from the designated node indicating that the designated node has received "split applied all" messages from every node in the plurality of nodes with an instance of the index atom,
wherein splitting the index atom ends when (1) every instance of the index atom has been split into a local instance of the source atom and a local instance of the target atom, (2) the nodes in the plurality of nodes with respective instances of the index atom are no longer forwarding messages, and (3) a root atom for the index atom has been modified to include a reference to the target atom.

19. The method of claim 18, further comprising:
terminating the second stage in response to each instance of the index atom in the distributed database being split into corresponding instances of the source atom and the target atom.

20. The method of claim 18, further comprising, during the second stage:
addressing messages referring to key values greater than the split key value to the source atom.

21. The method of claim 18, further comprising, after termination of the second stage:
addressing messages referring to key values greater than the split key value to the target atom.

* * * * *